(12) United States Patent
Hsiang

(10) Patent No.: US 11,303,898 B2
(45) Date of Patent: Apr. 12, 2022

(54) CODING TRANSFORM COEFFICIENTS WITH THROUGHPUT CONSTRAINTS

(71) Applicant: MediaTek Inc., Hsinchu (TW)

(72) Inventor: Shih-Ta Hsiang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 16/836,268

(22) Filed: Mar. 31, 2020

(65) Prior Publication Data

US 2020/0322607 A1 Oct. 8, 2020

Related U.S. Application Data

(60) Provisional application No. 62/828,947, filed on Apr. 3, 2019.

(51) Int. Cl.
| | |
|---|---|
| *H04N 19/13* | (2014.01) |
| *H04N 19/50* | (2014.01) |
| *H04N 19/18* | (2014.01) |
| *H04N 19/70* | (2014.01) |
| *H04N 19/176* | (2014.01) |
| *H04N 19/184* | (2014.01) |
| *H04N 19/182* | (2014.01) |

(52) U.S. Cl.
CPC ........... *H04N 19/13* (2014.11); *H04N 19/176* (2014.11); *H04N 19/18* (2014.11); *H04N 19/182* (2014.11); *H04N 19/184* (2014.11); *H04N 19/50* (2014.11); *H04N 19/70* (2014.11)

(58) Field of Classification Search
CPC .... H04N 19/13; H04N 19/176; H04N 19/182; H04N 19/184; H04N 19/50; H04N 19/70
See application file for complete search history.

(56) References Cited

U.S. PATENT DOCUMENTS

| | | | |
|---|---|---|---|
| 2015/0281706 A1* | 10/2015 | Strom | H04N 19/65 375/240.02 |
| 2017/0064336 A1* | 3/2017 | Zhang | H04N 19/122 |
| 2017/0310999 A1* | 10/2017 | Hebel | H04N 19/147 |

FOREIGN PATENT DOCUMENTS

| | | |
|---|---|---|
| CN | 104221374 A | 12/2014 |
| WO | WO 2017/041676 A1 | 3/2017 |

OTHER PUBLICATIONS

Combined Taiwanese Office Action and Search Report dated May 25, 2021 in Taiwanese Patent Application No. 109111194 (with English translation of categories of cited documents), 7 pages.

* cited by examiner

*Primary Examiner* — Jonathan R Messmore
(74) *Attorney, Agent, or Firm* — Oblon, McClelland, Maier & Neustadt, L.L.P.

(57) ABSTRACT

A video decoder receives data from a bitstream for a block of pixels to be decoded as a current block of a current picture of a video. The current block includes a transform block. The video decoder determines a regular bin budget for the transform block. The video decoder entropy decodes the transform block as either regular bins using context modeling or as bypass bins without context modeling. A number of the regular bins used for entropy coding the transform block is limited by the determined regular bin budget regardless of whether the regular bins represent samples of (i) residual signals used to reconstruct pixel data of the current block or (ii) transform coefficients generated by transform operations of the residual signals. The video decoder reconstructs the current block based on the entropy decoded transform block.

13 Claims, 9 Drawing Sheets

CODING TRANSFORM COEFFICIENTS WITH THROUGHPUT CONSTRAINTS

CROSS REFERENCE TO RELATED PATENT APPLICATION(S)

The present disclosure is part of a non-provisional application that claims the priority benefit of U.S. Provisional Patent Application No. 62/828,947 filed on 3 Apr. 2019. Contents of above-listed application are herein incorporated by reference.

TECHNICAL FIELD

The present disclosure relates generally to video processing. In particular, the present disclosure relates to methods of context coding residuals of transform coefficients.

BACKGROUND

Unless otherwise indicated herein, approaches described in this section are not prior art to the claims listed below and are not admitted as prior art by inclusion in this section.

High-efficiency video coding (HEVC) is the latest international video coding standard developed by the Joint Collaborative Team on Video Coding (JCT-VC). The input video signal is predicted from the reconstructed signal, which is derived from the coded picture regions. The prediction residual signal is processed by a linear transform. The transform coefficients are quantized, and entropy coded together with other side information in the bitstream. The reconstructed signal is generated from the prediction signal and the reconstructed residual signal after inverse transform on the de-quantized transform coefficients. The reconstructed signal is further processed by in-loop filtering for removing coding artifacts. The decoded pictures are stored in the frame buffer for predicting the future pictures in the input video signal.

In HEVC, a coded picture is partitioned into non-overlapped square block regions represented by the associated coding tree units (CTUs). A coded picture can be represented by a collection of slices, each comprising an integer number of CTUs. The individual CTUs in a slice are processed in a raster scanning order. A bi-predictive (B) slice may be decoded using intra prediction or inter prediction using at most two motion vectors and reference indices to predict the sample values of each block. A predictive (P) slice is decoded using intra prediction or inter prediction using at most one motion vector and reference index to predict the sample values of each block. An intra (I) slice is decoded using intra prediction only.

A CTU can be partitioned into multiple non-overlapped coding units (CUs) using the recursive quadtree (QT) structure to adapt to various local motion and texture characteristics. A CTU may also be partitioned into one or multiple smaller size CUs by a quadtree with nested multi-type tree using binary and ternary split. The resulting CU partitions can be in square or rectangular shapes.

One or more prediction units (PU) are specified for each CU. The prediction unit, together with the associated CU syntax, works as a basic unit for signaling the predictor information. The specified prediction process is employed to predict the values of the associated pixel samples inside the PU. A CU can be further partitioned using the residual quadtree (RQT) structure for representing the associated prediction residual signal. The leaf nodes of the RQT correspond to the transform units (TUs). A transform unit is comprised of a transform block (TB) of luma samples of size 8×8, 16×16, or 32×32 or four transform blocks of luma samples of size 4×4, and two corresponding transform blocks of chroma samples of a picture in 4:2:0 color format. An integer transform is applied to a transform block and the level values of quantized coefficients together with other side information are entropy coded in the bitstream.

The terms coding tree block (CTB), coding block (CB), prediction block (PB), and transform block (TB) are defined to specify the 2-D sample array of one color component associated with CTU, CU, PU, and TU, respectively. Thus, a CTU consists of one luma CTB, two chroma CTBs, and associated syntax elements. A similar relationship is valid for CU, PU, and TU. The tree partitioning is generally applied simultaneously to both luma and chroma, although exceptions apply when certain minimum sizes are reached for chroma.

A coded block flag (CBF) is utilized to signal if there is any non-zero transform coefficient in a transform block. When the CBF is equal to 0, the associated transform block is not further coded and all the coefficients in the current transform block are inferred to be equal to 0. Otherwise, the associated transform block contains at least one nonzero transform coefficient. A nonzero transform block is further divided into non-overlapped subblocks. A syntax element coded_sub_block_flag may be signaled to indicate whether a current subblock contains any nonzero coefficients. When coded_sub_block_flag is equal to 0, the associated transform subblock is not further coded and all the coefficients in the current transform subblock are inferred to be equal to 0. Otherwise, the associated transform block contains at least one non-zero transform coefficient. The values of the transform coefficient levels in the associated subblock are entropy coded using multiple subblock coding passes. In each coding pass, the individual transform coefficients are visited once according to a pre-defined scanning order.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments provide methods of entropy coding blocks of pixels. In some embodiments, a video decoder receives data from a bitstream for a block of pixels to be decoded as a current block of a current picture of a video. The current block includes a transform block. The video decoder determines a regular bin budget for the transform block. The video decoder entropy decodes the transform block as either regular bins using context modeling or as bypass bins without context modeling. A number of the regular bins used for entropy coding the transform block is limited by the determined regular bin budget regardless of whether the regular bins represent samples of (i) residual signals used to reconstruct pixel data of the current block or (ii) transform coefficients generated by transform operations of the residual signals. The video decoder reconstructs the current block based on the entropy decoded transform block.

In some embodiments, a video encoder receives raw pixel data for a block of pixels to be encoded as a current block of a current picture of a video into a bitstream, the current block comprising a transform block. The video encoder determines a regular bin budget for the transform block. The video encoder encodes raw pixel data of the transform block into (i) samples of residual signals computed from the raw pixel data or (ii) samples of transform coefficients generated by transform operations of the residual signals. The video encoder entropy encodes the transform block as either regular bins using context modeling or as bypass bins without context modeling, wherein a number of the regular bins used for entropy coding the transform block is limited by the determined regular bin budget regardless of whether the regular bins represent (i) the samples of residual signals or (ii) the samples of transform coefficients.

BRIEF DESCRIPTION OF THE DRAWINGS

The accompanying drawings are included to provide a further understanding of the present disclosure and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

DETAILED DESCRIPTION

Figure 1:
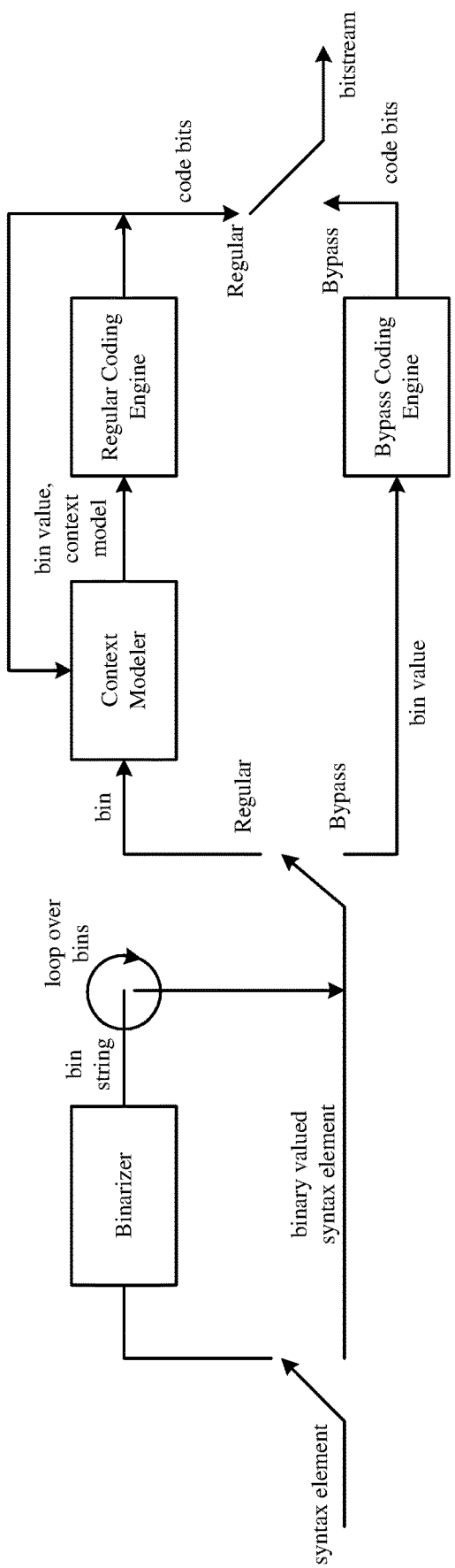
FIG. 1 illustrates entropy coding by context-based adaptive binary arithmetic coding (CABAC) process.

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

In HEVC, a syntax element sig_coeff_flag is signaled in the $1^{st}$ subblock coding pass to indicate whether the absolute value of a current transform coefficient level is greater than 0. A syntax element coeff_abs_level_greater1_flag is further signaled in the 2nd coding pass for a current coefficient with sig_coeff_flag equal to 1 to indicate whether the absolute value of the associated transform coefficient level is greater than 1. A syntax element coeff_abs_level_greater2_flag is further signaled in the 3rd coding pass for a current coefficient with coeff_abs_level_greater1_flag equal to 1 to indicate whether the absolute value of the associated transform coefficient level is greater than 2. The sign information and the remaining level values are further signaled by syntax elements coeff_sign_flag and coeff_abs_level_remaining in the $4^{th}$ coding and $5^{th}$ subblock coding passes, respectively.

In some embodiments, the transform coefficients may be quantized by dependent scalar quantization. The selection of one of the two quantizers is determined by a state machine with four states. The state for a current transform coefficient is determined by the state and the parity of the absolute level value for the preceding transform coefficient in scanning order. The transform blocks are partitioned into non-overlapped subblocks. The transform coefficients corresponding to the position (x, y) with x>32 or y>32 are forced to be equal to 0 for the TB block of width or height greater than 32. The transform coefficient levels in each subblock are entropy coded using multiple subblock coding passes. The syntax elements sig_coeff_flag, abs_level_gt1_flag, par_level_flag and abs_level_gt3_flag are signaled in the 1st subblock coding pass. The partially reconstructed absolute value of a transform coefficient level from the 1st pass is given by AbsLevelPass1=sig_coeff_flag+par_level_flag+ abs_level_gt1_flag+2*abs_level_gt3_flag Context selection for entropy coding sig_coeff_flag is dependent on the state for the current coefficient. The parameter par_level_flag is thus signaled in the $1^{st}$ coding pass for deriving the state for the next coefficient. The syntax elements abs_remainder and coeff_sign_flag are further signaled in the following subblock coding passes to indicate the remaining coefficient level values and signs, respectively. The fully reconstructed absolute value of a transform coefficient level is given by AbsLevel=AbsLevelPass1+2*abs_remainder The transform coefficient level is given by TransCoeffLevel=(2*AbsLevel−(QState>1?1:0))*(1− 2*coeff_sign_flag), where QState indicates the state for the current transform coefficient.

Transform skip (TS) mode is an entropy coding mode in which the quantized residual signal is entropy coded without going through the transform operation. In other words, residual signals in pixel domain are directly quantized and entropy coded without transform. In some embodiments, for entropy coding transform blocks (TB) associated with the transform skip mode, the syntax elements sig_coeff_flag, coeff_sign_flag, abs_level_gt1_flag, and par_level_flag are signaled in the $1^{st}$ subblock pass. The syntax elements abs_level_gt3_flag, abs_level_gt5_flag, abs_level_gt7_flag, and abs_level_gt9_flag are entropy coded in the subblock coding passes 2, 3, 4, and 5, respectively.

For some embodiments, the context-based adaptive binary arithmetic coding (CABAC) mode, or known as regular mode, is employed for entropy coding the values of the syntax elements in HEVC. As the arithmetic coder in the CABAC engine encodes the binary symbol values, the CABAC operation initially converts the value of a syntax element into a binary string (this process is commonly referred to as binarization). During the coding process, the probability models are gradually built up from the coded symbols for the different contexts. The selection of the modeling context for coding the next binary symbol (or the next set of bins) can be determined by the coded information. Symbols can be coded without the context modeling stage and assume an equal probability distribution, commonly referred to as the bypass mode, for improving bitstream parsing throughput rate.

FIG. 1 illustrates entropy coding by context-based adaptive binary arithmetic coding (CABAC) process. As illustrated, syntax elements are selectively coded into bitstream in regular mode as regular bins using context modeling, or in bypass mode as bypass bins without context modeling.

In HEVC, the values of the syntax elements coded_sub_block_flag, sig_coeff_flag, coeff_abs_level_greater1_flag, and coeff_abs_level_greater2_flag in a transform subblock are coded in the regular mode. The values of the syntax elements coeff_sign_flag and coeff_abs_level_remaining in a transform subblock are coded in the bypass mode. In order to limit the total number of the regular bins for entropy coding tranform coefficient levels in a subblock under the worst-case scenario, each subblock is allowed to code up to eight coeff_abs_level_greater1_flag values and one coeff_abs_level_greater2_flag value. In this way, the maximum total number of the regular bins from subblock coding passes in each subblock is limited to 26.

In some embodiments, the syntax elements sig_coeff_flag, abs_level_gt1_flag, par_level_flag and abs_level_gt3_flag are entropy coded in the regular CABAC mode in the $1^{st}$ subblock coding pass. The maximum allowed numbers of the context-coded bins for the 1st coding pass are constrained to be less than or equal to 32 for each 4×4 subblock, and 8 for each 2×2 subblock. The number of the context-coded bins for coding syntax elements sig_coeff_flag, abs_level_gt1_flag, par_level_flag and abs_level_gt3_flag are counted during the 1st subblock coding pass. When the remaining bin budget is less than 4 before coding a transform coefficient, the 1st subblock coding pass terminates.

In some embodiments, a video coder may have a constraint on the total number of the context-coded bins for entropy coding transform coefficients in a transform block (TB) or transform unit (TU) while not imposing any constraints on the total numbers of the context-coded bins for individual subblock, syntax elements and coding passes. A maximum allowed number of regular bins is specified for a TB or TU. The video coder may track the accumulated number of consumed context-coded bins during the entropy coding process in the current TB or TU. When the specified regular bin budget (under the specified constraint on the total number of the context-coded bins) is reached or nearly reached, the video coder may have the CABAC engine switched to the bypass mode for the remaining coding passes in the current TB/TU. Or the video coder may terminate the current coding passes in the regular CABAC mode and code the remaining absolute values of the transform coefficients in the bypass coding pass.

Figure 2A:
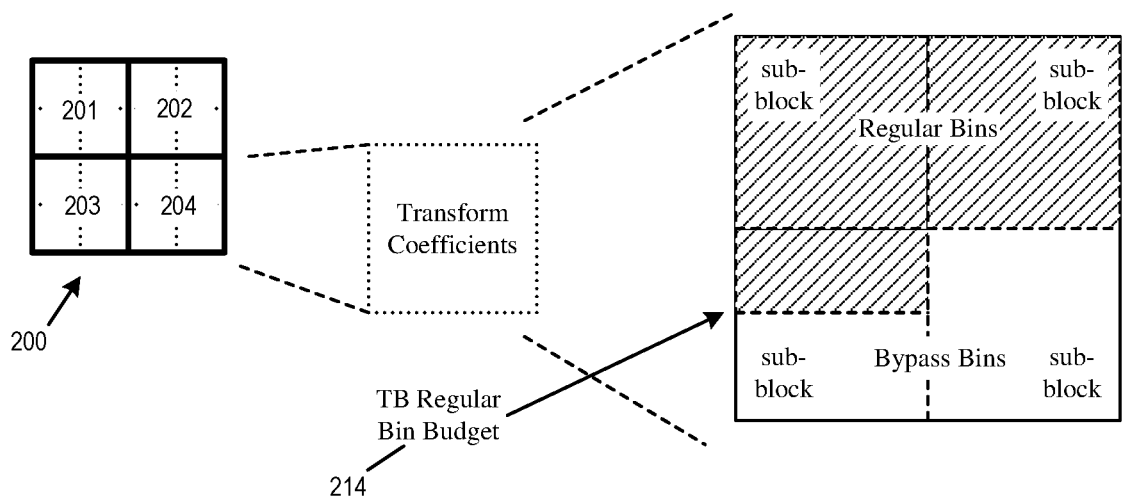
FIGS. 2a-b conceptually illustrates entropy coding a block of pixels, in which a maximum number of regular bins is specified for a TB.
Figure 2B:
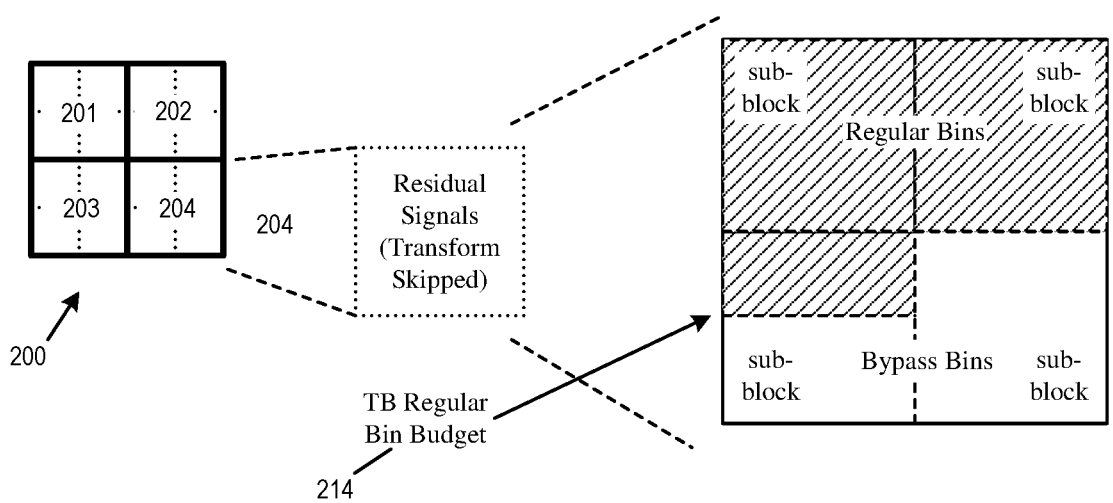

FIGS. 2a-b conceptually illustrates entropy coding a block of pixels 200, in which a maximum number of regular bins is specified for a TB. As illustrated, the block of pixel 200 is currently being coded as a current block. The current block 200 is being entropy coded by an entropy encoder or decoder. The current block 200 is partitioned into several subblocks. The current block 200 is also partitioned into four TBs 201-204, each of which encompasses one or more subblocks.

Both FIG. 2a and FIG. 2b show entropy coding of the TB 204. However, FIG. 2a illustrates a scenario in which the pixel data of the TB 204 is coded as (quantized) transform coefficients generated by applying transform operations to residual signals (difference between pixel data and prediction), while FIG. 2b illustrates a scenario in which the pixel data of the TB 204 is coded as (quantized) residual signals without transform operations. In some embodiments, the video codec may signal to indicate that the TB 204 is a transform-skipped block.

When entropy coding (encode or decode) is performed on the TB 204 to convert residual signals or transform coefficients to bins, a TB regular bin budget 214 (or a maximum number of regular bins), constrains the number of regular bins that can be used to code the residual signals or transform coefficients of the TB 204. Once the TB regular bin budget is met 214, the remainder residual signals or transform coefficients to bins of the TB are coded as bypass bins.

In some embodiments, the same maximum allowed number of regular bins is applicable regardless of whether the TB is a transform-skipped TB. In other words, the TB regular bin budget 214 (maximum allowed number of regular bins for the TB 201) is applicable regardless of whether the values being entropy coded are the residual signals in pixel domain (the example of FIG. 2b) or the transform coefficients of the residual signals in transform domain (the example of FIG. 2a). In some embodiments, whether a TU is transform-skipped is indicated by a transform_skip_flag (e.g., transform_skip_flag=1 indicates that the TU is transform-skipped and transform_skip_flag=0 indicates that the TU is not transform-skipped).

In some embodiments, the entropy coding process can be regarded as including two different types of bitstream generating or parsing processes for coding residual blocks. One of the two types of bitstream assembling processes is applicable to only residual blocks without transform operation. The two types of bitstream assembling processes are subject to a same constraint on the max allowed number of context-coded bins for coding residual samples in each residual block. The constraint is specified by maxRegBinsCoeff*nTBSamples. (The parameter maxRegBinsCoeff or maxRegBinsPerCoeff is the maximum allowed number of regular bins per sample; nTBSamples specifies number of samples in the current TB/TU, i.e., the size of the current TB/TU. In some embodiments, maxRegBinsCoeff is set equal to 2.)

The specified constraints may be pre-defined or explicitly signaled in the bitstream, for example, using one or more than one syntax element in the high-level syntax sets such as the sequence parameter set (SPS), the picture parameter set (PPS), the tile group header, or/and the slice header. The specified constraints may be dependent on the profile and the level indicated in the coded bitstream. The different constraints may be adopted for different color components. The different constraints may be adopted for different TB or TU sizes. In some embodiments, the maximum allowed number of regular bins is proportional to the current TU/TB size measured by the total number of transform coefficients in the current TB/TU. In some embodiments, the current TU/TB size may be the size of the TU/TB including or excluding the high-frequency subblock regions with forced zero values.

As mentioned, a video coder may have a constraint on the total number of the context-coded bins for entropy coding the values of transform coefficients in a TB or TU. The video coder tracks the accumulated number of the context-coded bins for entropy coding the syntax elements in a TB or TU, including the syntax elementsforsignaling theposition-ofthelast significant coefficient, the coded subblock flags, and the partial absolute values of transform coefficient levels in the TB or TU. Table 1 provides an example syntax table for parsing a residual transform block for some embodiments. In the table, maxRegBinsCoeff is the maximum allowed number of regular bins per sample, the variables lastSigCoeffXPrefixBins and lastSigCoeffYPrefixBins are the numbers of the consumed regular bins for entropy coding the syntax elements last_sig_coeff_x_prefix and last_sig_coeff_y_prefix, respectively.

TABLE 1

| Syntax table for parsing a transform block | |
|---|---|
| residual_coding( x0, y0, log2TbWidth, log2TbHeight, cIdx ) { | Descriptor |
|   remBinsPass1 = maxRegBinsCoeff * ( 1 << ( log2TbWidth + log2TbHeight ) ) | |
|   if( ( tu_mts_idx[ x0 ][ y0 ] > 0 \|\| | |
|     ( cu_sbt_flag && log2TbWidth < 6 && log2TbHeight < 6 ) ) | |
|     && cIdx = = 0 && log2TbWidth > 4 ) | |
|     log2TbWidth = 4 | |
|   else | |
|     log2TbWidth = Min( log2TbWidth, 5 ) | |
|   if( ( tu_mts_idx[ x0 ][ y0 ] > 0 \|\| | |
|     ( cu_sbt_flag && log2TbWidth < 6 && log2TbHeight < 6 ) ) | |
|     && cIdx = = 0 && log2TbWidth > 4 ) | |
|     log2TbWidth = 4 | |
|   else | |
|     log2TbHeight = Min( log2TbHeight, 5 ) | |
|   if( log2TbWidth > 0 ) | |
|     last_sig_coeff_x_prefix | ae(v) |
|   if( log2TbHeight > 0 ) | |
|     last_sig_coeff_y_prefix | ae(v) |
|   if( last_sig_coeff_x_prefix > 3 ) | |
|     last_sig_coeff_x_suffix | ae(v) |
|   if( last_sig_coeff_y_prefix > 3 ) | |
|     last_sig_coeff_y_suffix | ae(v) |
|   remBinsPass1 −= ( lastSigCoeffXPrefixBins + lastSigCoeffYPrefixBins ) | |
|   log2SbW = ( Min( log2TbWidth, log2TbHeight ) < 2 ? 1 : 2 ) | |
|   log2SbH = log2SbW | |
|   if ( log2TbWidth < 2 && cIdx = = 0 ) { | |
|     log2SbW = log2TbWidth | |
|     log2SbH = 4 − log2SbW | |
|   } else if ( log2TbHeight < 2 && cIdx = = 0 ) { | |
|     log2SbH = log2TbHeight | |
|     log2SbW = 4 − log2SbH | |
|   } | |
|   numSbCoeff = 1 << ( log2SbW + log2SbH ) | |
|   lastScanPos = numSbCoeff | |
|   lastSubBlock = ( 1 << ( log2TbWidth + log2TbHeight − ( log2SbW + log2SbH ) ) ) − 1 | |
|   do { | |
|     if( lastScanPos = = 0 ) { | |
|       lastScanPos = numSbCoeff | |
|       lastSubBlock− − | |
|     } | |
|     lastScanPos− − | |
|     xS = DiagScanOrder[ log2TbWidth − log2SbW ][ log2TbHeight − log2SbH ] | |
|       [ lastSubBlock ][ 0 ] | |
|     yS = DiagScanOrder[ log2TbWidth − log2SbW ][ log2TbHeight − log2SbH ] | |
|       [ lastSubBlock ][ 1 ] | |
|     xC = ( xS << log2SbW ) + DiagScanOrded[ log2SbW ][ log2SbH ][ lastScanPos ][ 0 ] | |
|     yC = ( yS << log2SbH ) + DiagScanOrded[ log2SbW ][ log2SbH ][ lastScanPos ][ 1 ] | |
|   } while( ( xC != LastSignificantCoeffX ) \|\| ( yC != LastSignificantCoeffY ) ) | |
|   QState = 0 | |
|   for( i = lastSubBlock; i >= 0; i− − ) { | |
|     startQStateSb = QState | |
|     xS = DiagScanOrder[ log2TbWidth − log2SbW ][ log2TbHeight − log2SbH ] | |
|       [ lastSubBlock ][ 0 ] | |
|     yS = DiagScanOrder[ log2TbWidth − log2SbW ][ log2TbHeight − log2SbH ] | |
|       [ lastSubBlock ][ 1 ] | |
|     inferSbDcSigCoeffFlag = 0 | |
|     if( ( i < lastSubBlock ) && ( i > 0 ) ) { | |
|       coded_sub_block_flag[ xS ][ yS ] | ae(v) |
|       remBinsPass1− − | |
|       inferSbDcSigCoeffFlag = 1 | |
|     } | |
|     firstSigScanPosSb = numSbCoeff | |
|     lastSigScanPosSb = −1 | |
|     firstPosMode0 = ( i = = lastSubBlock ? lastScanPos : numSbCoeff − 1 ) | |
|     firstPosMode1 = −1 | |

TABLE 1-continued

Syntax table for parsing a transform block

| residual_coding( x0, y0, log2TbWidth, log2TbHeight, cIdx ) { | Descriptor |
|---|---|
|     for( n = firstPosMode0; n >= 0 && remBinsPass1 >= 4; n− − ) { | |
|       xC = ( xS << log2SbW ) + DiagScanOrder[ log2SbW ][ log2SbH ][ n ][ 0 ] | |
|       yC = ( yS << log2SbH ) + DiagScanOrder[ log2SbW ][ log2SbH ][ n ][ 1 ] | |
|       if( coded_sub_block_flag[ xS ][ yS ] && ( n > 0 \|\| !inferSbDcSigCoeffFlag ) && ( xC != LastSignificantCoeffX \|\| yC != Last SignificantCoeffY ) ) { | |
|         sig_coeff_flag[ xC ][ yC ] | ae(v) |
|         remBinsPass1− − | |
|         if( sig_coeff_flag[ xC ][ yC] ) | |
|           inferSbDcSigCoeffFlag = 0 | |
|       } | |
|       if( sig_coeff_flag[ xC ][ yC ] ) { | |
|         abs_level_gt1_flag[ n ] | ae(v) |
|         remBinsPass1− − | |
|         if( abs_level_gt1_flag[ n ] ) { | |
|           par_level_flag[ n ] | ae(v) |
|           remBinsPass1− − | |
|           abs_level_gt3_flag[ n ] | ae(v) |
|           remBinsPass1− − | |
|         } | |
|         if( lastSigScanPosSb = = −1 ) | |
|           lastSigScanPosSb = n | |
|         firstSigScanPosSb = n | |
|       } | |
|       AbsLevelPass1[ xC ][ yC ] = sig_coeff_flag[ xC ][ yC] + par_level_flag[ n ] + abs_level_gt1_flag[ n ] + 2 * abs_level_gt3_flag[ n ] | |
|       if( dep_quant_enabled_flag ) | |
|         QState = QStateTransTable[ QState ][ AbsLevelPass1[ xC ][ yC ] & 1 ] | |
|       if( remBinsPass1 < 4 ) | |
|         firstPosMode1 = n − 1 | |
|     } | |
|     for( n = numSbCoeff − 1; n >= firstPosMode1; n− − ) { | |
|       xC = ( xS << log2SbW ) + DiagScanOrder[ log2SbW ][ log2SbH ][ n ][ 0 ] | |
|       yC = ( yS << log2SbH ) + DiagScanOrder[ log2SbW ][ log2SbH ][ n ][ 1 ] | |
|       if( abs_level_gt3_flag[ n ] ) | |
|         abs_remainder[ n ] | ae(v) |
|       AbsLevel[ xC ][ yC ] = AbsLevelPass1[ xC ][ yC ] +2 * abs_remainder[ n ] | |
|     } | |
|     for( n = firstPosMode1; n >= 0; n− − ) { | |
|       xC = ( xS << log2SbW ) + DiagScanOrder[ log2SbW ][ log2SbH ][ n ][ 0 ] | |
|       yC = ( yS << log2SbH ) + DiagScanOrder[ log2SbW ][ log2SbH ][ n ][ 1 ] | |
|       dec_abs_level[ n ] | ae(v) |
|       if( AbsLevel[ xC ][ yC ] > 0 ) | |
|         firstSigScanPosSb = n | |
|       if( dep_quant_enabled_flag ) | |
|         QState = QStateTransTable[ QState ][ AbsLevel[ xC ][ yC ] & 1 ] | |
|     } | |
|     if( dep_quant_enabled_flag \|\| !sign_data_hiding_enabled_flag ) | |
|       signHidden = 0 | |
|     else | |
|       signHidden = ( lastSigScanPosSb − firstSigScanPosSb > 3 ? 1 : 0 ) | |
|     for( n = numSbCoeff − 1; n >= 0; n− − ) { | |
|       xC = ( xS << log2SbW ) + DiagScanOrder[ log2SbW ][ log2SbH ][ n ][ 0 ] | |
|       yC = ( yS << log2SbH ) + DiagScanOrder[ log2SbW ][ log2SbH ][ n ][ 1 ] | |
|       if( ( AbsLevel[ xC ][ yC ] > 0 ) && ( !signHidden \|\| ( n != firstSigScanPosSb ) ) ) | |
|         coeff_sign_flag[ n ] | ae(v) |
|     } | |
|     if( dep_quant_enabled_flag ) { | |
|       QState = startQStateSb | |
|       for( n = numSbCoeff − 1; n >= 0; n− − ) { | |
|         xC = ( xS << log2SbW ) + DiagScanOrder[ log2SbW ][ log2SbH ][ n ][ 0 ] | |
|         yC = ( yS << log2SbH ) + DiagScanOrder[ log2SbW ][ log2SbH ][ n ][ 1 ] | |
|         if( ( AbsLevel[ xC ][ yC ] > 0 ) | |
|           TransCoeffLevel[ x0 ][ y0 ][ cIdx ][ xC ][ yC ] = ( 2 * AbsLevel[ xC ][ yC ] − ( QState > 1 ? 1: 0 ) ) * ( 1 − 2 * coeff_sign_flag[ n ] ) | |
|         QState = QStateTransTable[ QState ][ par_level_flag[ n ] ] | |
|     } else { | |
|       sumAbsLevel = 0 | |
|       for( n = numSbCoeff − 1; n >= 0; n− − ) { | |
|         xC = ( xS << log2SbW ) + DiagScanOrder[ log2SbW ][ log2SbH ][ n ][ 0 ] | |
|         yC = ( yS << log2SbH ) + DiagScanOrder[ log2SbW ][ log2SbH ][ n ][ 1 ] | |
|         if( AbsLevel[ xC ][ yC ] > 0 ) { | |
|           TransCoeffLevel[ x0 ][ y0 ][ cIdx ][ xC ][ yC ] = AbsLevel[ xC ][ yC ] * ( 1 − 2 * coeff_sign_flag[ n ] ) | |
|           if( signHidden ) { | |

TABLE 1-continued

Syntax table for parsing a transform block

| residual_coding( x0, y0, log2TbWidth, log2TbHeight, cIdx ) { | Descriptor |
|---|---|

```
                sumAbsLevel += AbsLevel[ xC ][ yC ]
                if( ( n = = firstSigScanPosSb ) && ( sumAbsLevel % 2 ) = = 1 ) )
                    TransCoeffLevel[ x0 ][ y0 ][ cIdx ][ xC ][ yC ] =
                        −TransCoeffLevel[ x0 ][ y0 ][ cIdx ][ xC ][ yC ]
                }
            }
          }
        }
      }
}
```

In some embodiments, the maximum allowed number of regular bins per sample for entropy coding transform coefficients in a residual block when transform_skip_flag equal to 0 and the maximum allowed number of regular bins per sample for entropy coding the residual samples in a residual block when transform_skip_flag equal to 1 are set to the same value or nearly the same value. In this way, the residual blocks can be entropy coded under the same constraint on the maximum allowed number of the regular bins per sample in each residual block. In some embodiments, the video coder may further count in other syntax elements in a TB or TU such as tu_cbf_luma, tu_cbf_cb, tu_cbf_cr, and tu_joint_cbcr_residual.

Any of the foregoing proposed methods can be implemented in encoders and/or decoders. For example, any of the proposed methods can be implemented in an entropy coding module of an encoder, and/or an entropy coding module of a decoder. Alternatively, any of the proposed methods can be implemented as a circuit integrated to the entropy coding module of the encoder and/or the entropy coding module of the decoder.

II. Example Video Encoder

Figure 3:
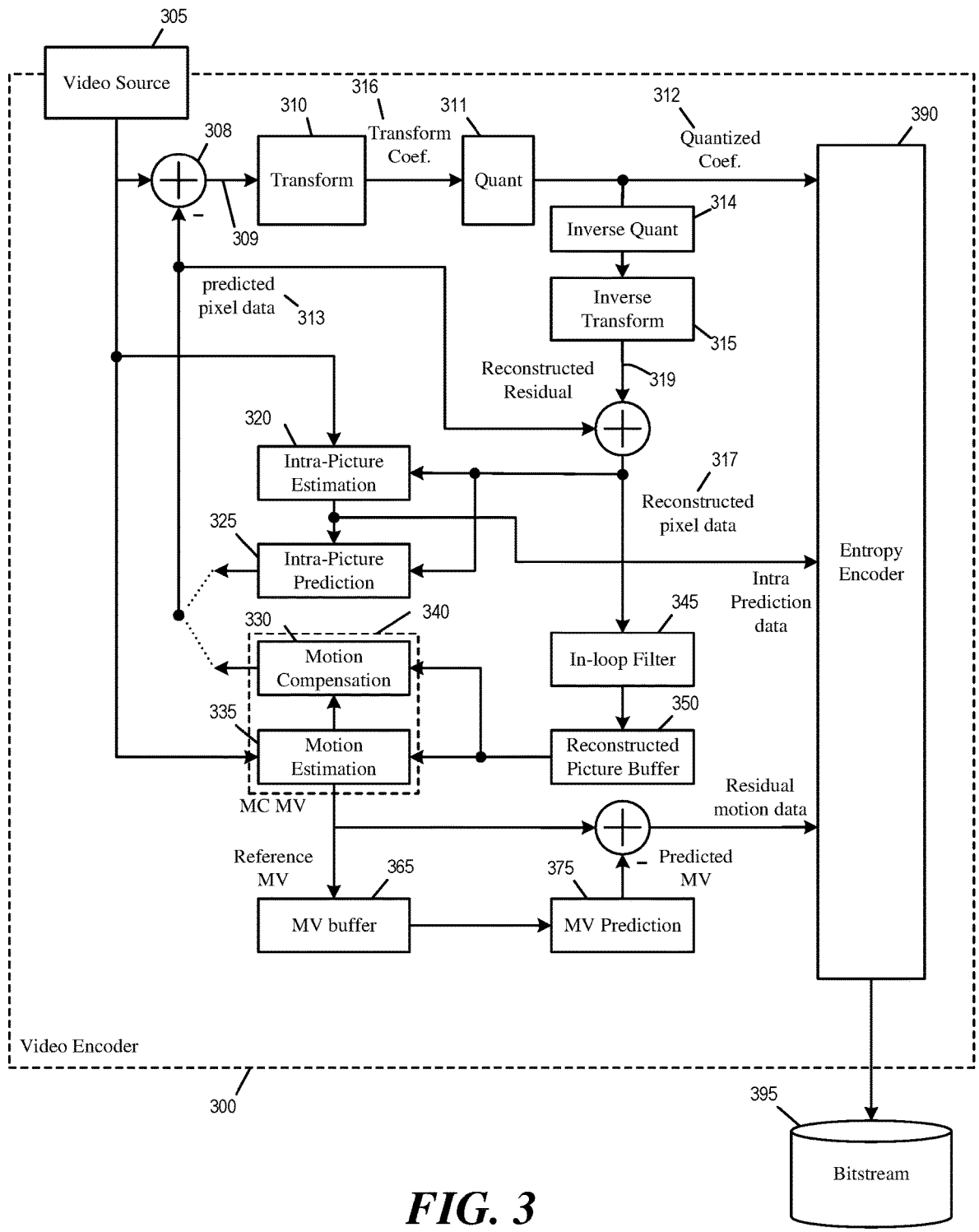
FIG. 3 illustrates an example video encoder.

FIG. 3 illustrates an example video encoder 300. As illustrated, the video encoder 300 receives input video signal from a video source 305 and encodes the signal into bitstream 395. The video encoder 300 has several components or modules for encoding the signal from the video source 305, at least including some components selected from a transform module 310, a quantization module 311, an inverse quantization module 314, an inverse transform module 315, an intra-picture estimation module 320, an intra-prediction module 325, a motion compensation module 330, a motion estimation module 335, an in-loop filter 345, a reconstructed picture buffer 350, a MV buffer 365, and a MV prediction module 375, and an entropy encoder 390. The motion compensation module 330 and the motion estimation module 335 are part of an inter-prediction module 340.

In some embodiments, the modules 310-390 are modules of software instructions being executed by one or more processing units (e.g., a processor) of a computing device or electronic apparatus. In some embodiments, the modules 310-390 are modules of hardware circuits implemented by one or more integrated circuits (ICs) of an electronic apparatus. Though the modules 310-390 are illustrated as being separate modules, some of the modules can be combined into a single module.

The video source 305 provides a raw video signal that presents pixel data of each video frame without compression. A subtractor 308 computes the difference between the raw video pixel data of the video source 305 and the predicted pixel data 313 from the motion compensation module 330 or intra-prediction module 325. The transform module 310 converts the difference (or the residual pixel data or residual signal 309) into transform coefficients (e.g., by performing Discrete Cosine Transform, or DCT). The quantization module 311 quantizes the transform coefficients into quantized data (or quantized coefficients) 312, which is encoded into the bitstream 395 by the entropy encoder 390.

The inverse quantization module 314 de-quantizes the quantized data (or quantized coefficients) 312 to obtain transform coefficients, and the inverse transform module 315 performs inverse transform on the transform coefficients to produce reconstructed residual 319. The reconstructed residual 319 is added with the predicted pixel data 313 to produce reconstructed pixel data 317. In some embodiments, the reconstructed pixel data 317 is temporarily stored in aline buffer (not illustrated) for intra-picture prediction and spatial MV prediction. The reconstructed pixels are filtered by the in-loop filter 345 and stored in the reconstructed picture buffer 350. In some embodiments, the reconstructed picture buffer 350 is a storage external to the video encoder 300. In some embodiments, the reconstructed picture buffer 350 is a storage internal to the video encoder 300.

The intra-picture estimation module 320 performs intra-prediction based on the reconstructed pixel data 317 to produce intra prediction data. The intra-prediction data is provided to the entropy encoder 390 to be encoded into bitstream 395. The intra-prediction data is also used by the intra-prediction module 325 to produce the predicted pixel data 313.

The motion estimation module 335 performs inter-prediction by producing MVs to reference pixel data of previously decoded frames stored in the reconstructed picture buffer 350. These MVs are provided to the motion compensation module 330 to produce predicted pixel data.

Instead of encoding the complete actual MVs in the bitstream, the video encoder 300 uses MV prediction to generate predicted MVs, and the difference between the MVs used for motion compensation and the predicted MVs is encoded as residual motion data and stored in the bitstream 395.

The MV prediction module 375 generates the predicted MVs based on reference MVs that were generated for encoding previously video frames, i.e., the motion compensation MVs that were used to perform motion compensation. The MV prediction module 375 retrieves reference MVs from previous video frames from the MV buffer 365. The video encoder 300 stores the MVs generated for the current video frame in the MV buffer 365 as reference MVs for generating predicted MVs.

The MV prediction module 375 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 395 by the entropy encoder 390.

The entropy encoder 390 encodes various parameters and data into the bitstream 395 by using entropy-coding techniques such as context-adaptive binary arithmetic coding (CABAC) or Huffman encoding. The entropy encoder 390 encodes various header elements, flags, along with the quantized transform coefficients 312, and the residual motion data as syntax elements into the bitstream 395. The bitstream 395 is in turn stored in a storage device or transmitted to a decoder over a communications medium such as a network.

The in-loop filter 345 performs filtering or smoothing operations on the reconstructed pixel data 317 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 4:
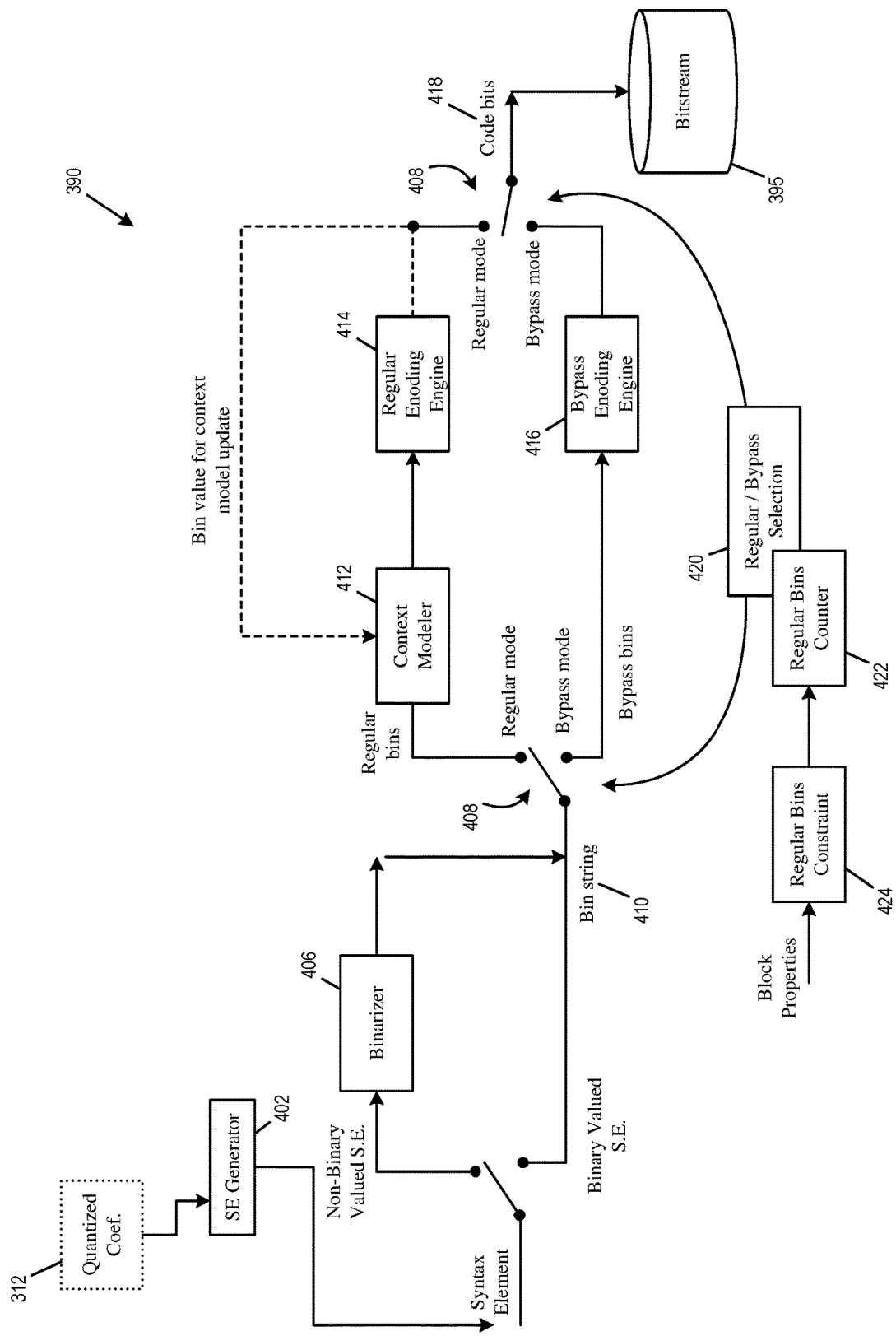
FIG. 4 illustrates portions of the video encoder that selectively entropy encodes syntax elements of a TB in either regular mode or bypass mode based on a constraint that limits the number of regular bins used for the TB.

FIG. 4 illustrates portions of the video encoder 300 that selectively entropy encodes syntax elements of a TB in either regular mode or bypass mode based on a constraint that limits the number of regular bins used for the TB. Specifically, a maximum allowed number of regular bins is imposed on each TB, regardless of whether transform operations are applied to the residual signals of the TB. The figure illustrates the components of the entropy encoder module 390.

A syntax element generator 402 generates syntax elements to be entropy coded, including syntax elements that are based on the quantized coefficients 312, which may be quantized version of the transform coefficients 316 or the residual signals 309 of the current TB. The syntax elements are generated according to predetermined coding passes (e.g., sig_coeff_flag, abs_level_gt1_flag, par_level_flag, abs_level_gt3_flag, tu_cbf_luma, tu_cbf_cb, tu_cbf_cr, tu_joint_cbcr_residual, last_sig_coeff_x_prefix, and last_sig_coeff_y_prefix).

The selected syntax elements are converted into bin strings 410 by the binarizer 406 (for non-binary valued syntax elements) or directly used as bin strings (for binary valued syntax elements). A regular/bypass mode switch 408 determines whether the syntax elements bin strings 410 are entropy coded as regular bins or bypass bins. Regular bins are processed by context modeler 412 and regular encoding engine 414 into code bits 418 using context modeling. Bypass bins are processed by bypass encoding engine 416 into code bits 418 without using context modeling. The code bits 418 are stored as part of the bitstream 395.

The regular/bypass mode switch 408 is controlled by a regular/bypass mode selection module 420. The regular/bypass mode selection module makes its decision as to whether to select regular mode or bypass mode by using a regular bins counter 422. The regular bins counter 422 counts the number of regular bins that are encoded for the current TB, and the regular/bypass mode switch 408 allows bin string to be encoded as regular bins as long as the regular bins counter is not larger or equal to a constraint 424, which specifies a TB regular bin budget or a maximum allowed number of regular bins for the TB being coded. The constraint 424 may be determined based on properties of the TB, e.g., in some embodiments, the constraint is proportional to the current TB size measured by the total number of transform coefficients in the current TB. In some embodiments, the current TB size may be the size of the TB including or excluding the high-frequency subblock regions with forced zero values. For example, in some embodiments, the constraint 424 is determined based on the parameter maxRegBinsCoeff, which specifies the maximum allowed number of regular bins per sample, thus the constraint 424 is computed based on maxRegBinsCoeff*nTBSamples.

Figure 5:
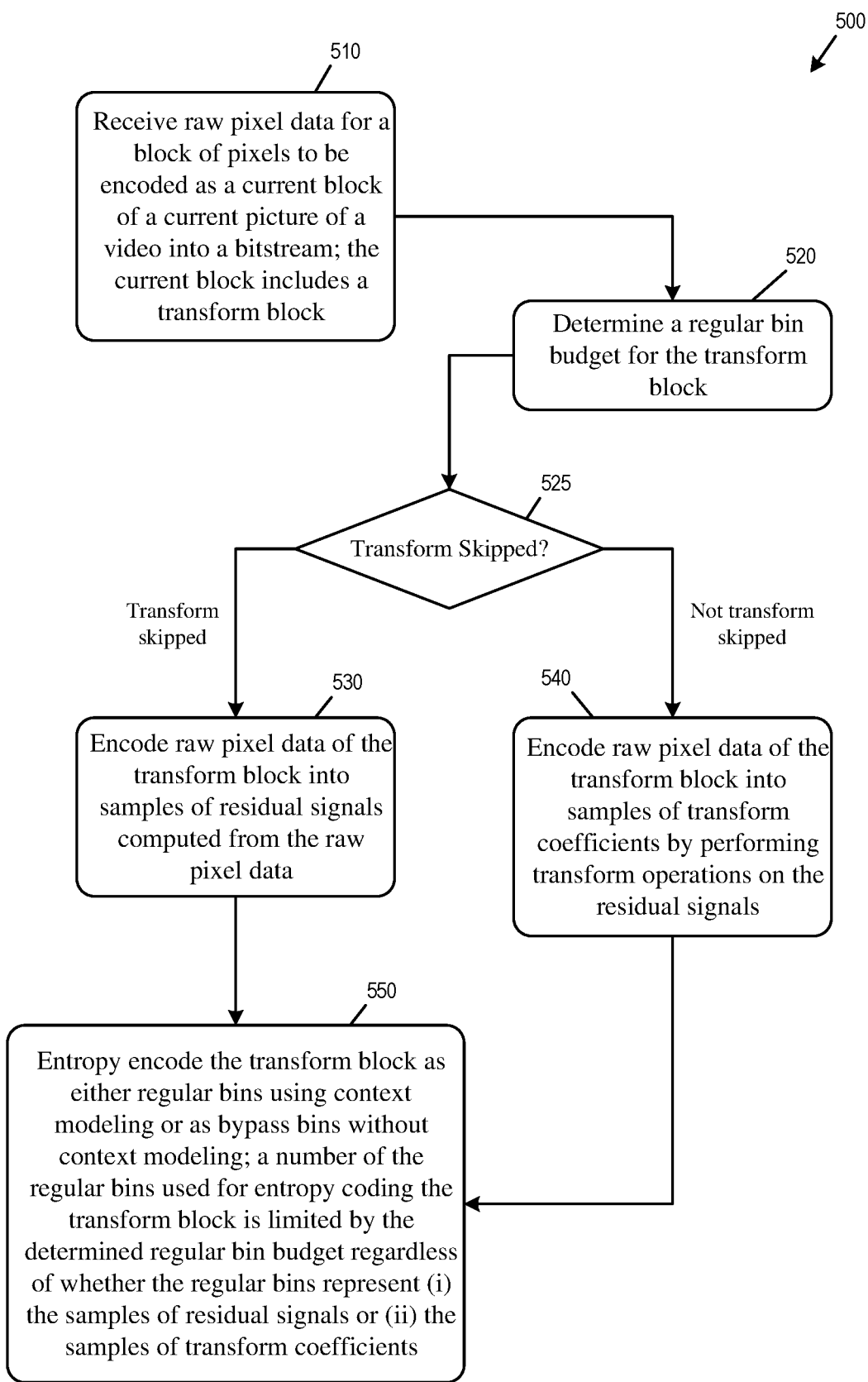
FIG. 5 conceptually illustrates a process for entropy encoding a transform block while imposing a constraint on number of regular bins used, regardless of whether the transform block is transform-skipped.

FIG. 5 conceptually illustrates a process 500 for entropy encoding a transform block while imposing a constraint on number of regular bins used, regardless of whether the transform block is transform-skipped. In some embodiments, one or more processing units (e.g., a processor) of a computing device implementing the encoder 300 performs the process 500 by executing instructions stored in a computer readable medium. In some embodiments, an electronic apparatus implementing the encoder 300 performs the process 500.

The encoder receives (at block 510) raw pixel data for a block of pixels to be encoded as a current block of a current picture of a video into a bitstream. The current block includes a transform block. In some embodiments, the transform block encompasses one or more subblocks of the current block.

The encoder determines (at block 520) a regular bin budget for the transform block. In some embodiments, the regular bin budget is computed based on (i) a maximum allowed number of regular bins per sample and (ii) a number of samples in the current transform block. In some embodiments, no constraint is applied on a total number of the context-coded bins for individual subblocks. In some embodiments, no constraint is applied on a total number of context-coded bins for an individual syntax element or a coding pass.

The encoder determines (at block 525) whether the transform block is a transform skipped block. In some embodiments, the bitstream comprises an indication signaling whether the transform block is a transform-skip block in which samples of residual signals are not transformed. If the transform block is a transform skipped block, the process proceeds to 530. Otherwise the process proceeds to 540.

The encoder encodes (at block 530) raw pixel data of the transform block into samples of residual signals (e.g., as the difference between the raw pixel data and a set of intra or inter predictions.) The process then proceeds to block 550.

The encoder encodes (at block 540) raw pixel data of the transform block into samples of transform coefficients by performing transform operations on the residual signals. The process then proceeds to block 550.

The encoder entropy encodes (at block 550) the transform block as either regular bins using context modeling or as bypass bins without context modeling. The number of the regular bins used for entropy coding the transform block is limited by the determined regular bin budget regardless of whether the regular bins represent (i) the samples of residual signals or (ii) the samples of transform coefficients.

In some embodiments, the number of the regular bins used for entropy coding the transform block also includes a number of regular bins used for entropy coding syntax elements for signaling a position of the last significant coefficient of the transform block. In some embodiments, the number of the regular bins used for entropy coding the transform block includes a number of regular bins used for entropy coding syntax elements for signaling one or more coded subblock flags. In some embodiments, the number of the regular bins used for entropy coding the transform block includes a number of regular bins used for entropy coding syntax elements for signaling partial absolute values of transform coefficient levels in the transform block.

III. Example Video Decoder

Figure 6:
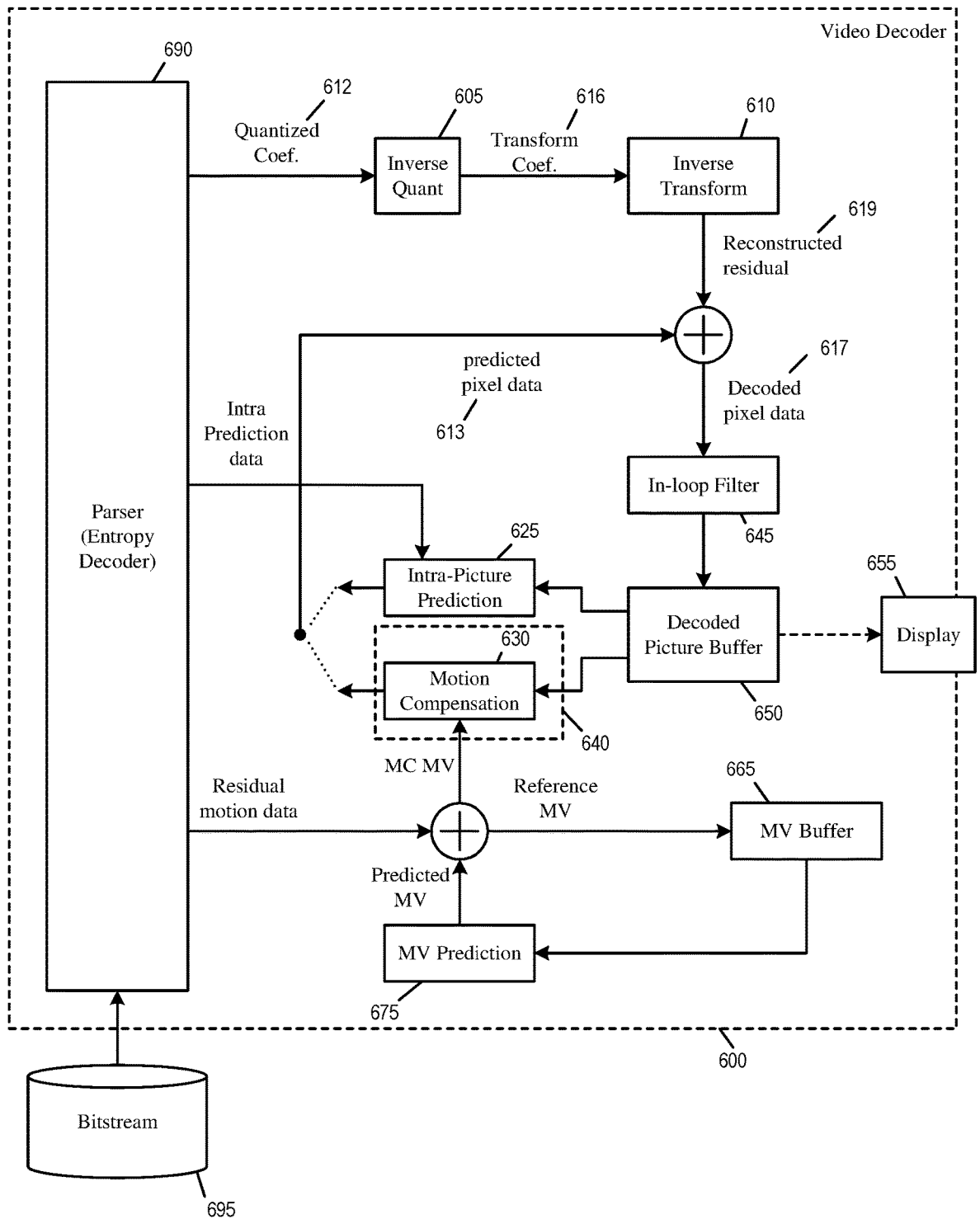
FIG. 6 illustrates an example video decoder.

FIG. 6 illustrates an example video decoder 600. As illustrated, the video decoder 600 is an image-decoding or video-decoding circuit that receives a bitstream 695 and decodes the content of the bitstream into pixel data of video frames for display. The video decoder 600 has several components or modules for decoding the bitstream 695, including some components selected from an inverse quantization module 605, an inverse transform module 610, an intra-prediction module 625, a motion compensation module 630, an in-loop filter 645, a decoded picture buffer 650, a MV buffer 665, a MV prediction module 675, and a parser 690. The motion compensation module 630 is part of an inter-prediction module 640.

In some embodiments, the modules 610-690 are modules of software instructions being executed by one or more processing units (e.g., a processor) of a computing device. In some embodiments, the modules 610-690 are modules of hardware circuits implemented by one or more ICs of an electronic apparatus. Though the modules 610-690 are illustrated as being separate modules, some of the modules can be combined into a single module.

The parser 690 (or entropy decoder) receives the bitstream 695 and performs initial parsing according to the syntax defined by a video-coding or image-coding standard. The parsed syntax element includes various header elements, flags, as well as quantized data (or quantized coefficients) 612. The parser 690 parses out the various syntax elements by using entropy-coding techniques such as context-adaptive binary arithmetic coding (CABAC) or Huffman encoding.

The inverse quantization module 605 de-quantizes the quantized data (or quantized coefficients) 612 to obtain transform coefficients, and the inverse transform module 610 performs inverse transform on the transform coefficients 616 to produce reconstructed residual signal 619. The reconstructed residual signal 619 is added with predicted pixel data 613 from the intra-prediction module 625 or the motion compensation module 630 to produce decoded pixel data 617. The decoded pixels data are filtered by the in-loop filter 645 and stored in the decoded picture buffer 650. In some embodiments, the decoded picture buffer 650 is a storage external to the video decoder 600. In some embodiments, the decoded picture buffer 650 is a storage internal to the video decoder 600.

The intra-prediction module 625 receives intra-prediction data from bitstream 695 and according to which, produces the predicted pixel data 613 from the decoded pixel data 617 stored in the decoded picture buffer 650. In some embodiments, the decoded pixel data 617 is also stored in a line buffer (not illustrated) for intra-picture prediction and spatial MV prediction.

In some embodiments, the content of the decoded picture buffer 650 is used for display. A display device 655 either retrieves the content of the decoded picture buffer 650 for display directly or retrieves the content of the decoded picture buffer to a display buffer. In some embodiments, the display device receives pixel values from the decoded picture buffer 650 through a pixel transport.

The motion compensation module 630 produces predicted pixel data 613 from the decoded pixel data 617 stored in the decoded picture buffer 650 according to motion compensation MVs (MC MVs). These motion compensation MVs are decoded by adding the residual motion data received from the bitstream 695 with predicted MVs received from the MV prediction module 675.

The MV prediction module 675 generates the predicted MVs based on reference MVs that were generated for decoding previous video frames, e.g., the motion compensation MVs that were used to perform motion compensation. The MV prediction module 675 retrieves the reference MVs of previous video frames from the MV buffer 665. The video decoder 600 stores the motion compensation MVs generated for decoding the current video frame in the MV buffer 665 as reference MVs for producing predicted MVs.

The in-loop filter 645 performs filtering or smoothing operations on the decoded pixel data 617 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 7:
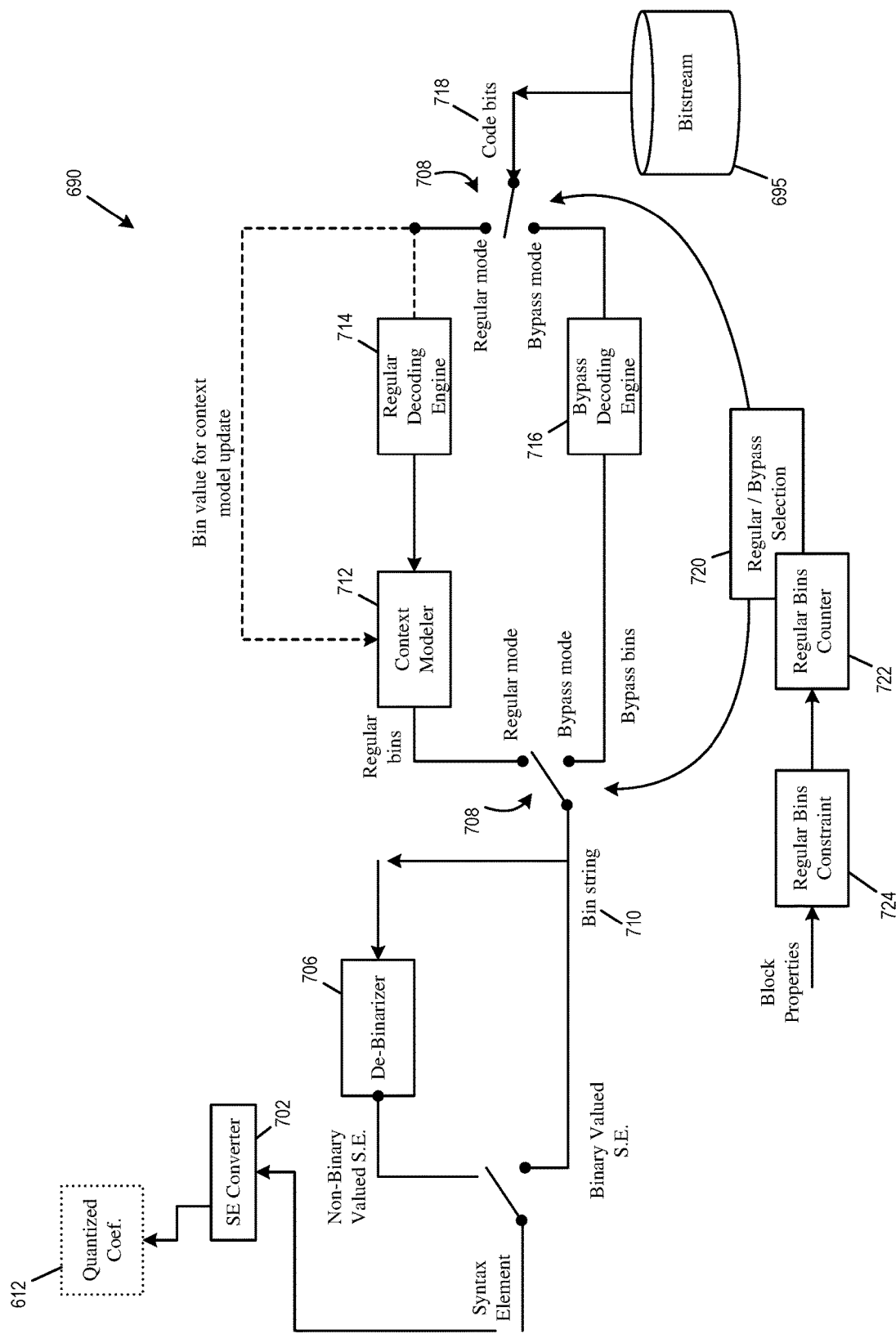
FIG. 7 illustrates portions of the video decoder that selectively entropy decodes syntax elements of a TB as either regular mode or bypass mode based on a constraint that limits the number of regular bins used for the TB.

FIG. 7 illustrates portions of the video decoder 600 that selectively entropy decodes syntax elements of a TB as either regular mode or bypass mode based on a constraint that limits the number of regular bins used for the TB. Specifically, a maximum allowed number of regular bins is imposed on each TB, regardless of whether transform operations are applied to the residual signals of the TB. The figure illustrates the components of the entropy decoder module 690.

The entropy decoder 690 receives code bits 718 from the bitstream 695. A regular/bypass mode switch 708 determines whether the code bits are to be decoded as regular bins or bypass bins. Code bits that are to be decoded as regular bins are processed by context modeler 712 and a regular decoding engine 714 into bin strings 710 using context modeling. Code bits that are to be decoded as bypass bins are processed by a bypass coding engine 716 into bin strings 710 without using context modeling.

The bin strings 710 are converted into syntax elements by the de-binarizer 706 (for non-binary valued syntax elements) or directly used as syntax elements (for binary valued syntax elements).

A syntax element converter 702 converts the syntax elements into signals or values to be used by various parts of the video decoder 600. Syntax elements are converted according to their orderings specified by predetermined coding passes. Some of the syntax elements are converted into quantized coefficients 612, which may be dequantized to be transform coefficients 616 or residual signal 609 of the current TB.

The regular/bypass mode switch 708 is controlled by a regular/bypass mode selection module 720. The regular/bypass mode selection module makes its decision as to whether to select regular mode or bypass mode by using a regular bins counter 722. The regular bins counter 722 counts the number of regular bins that are decoded for the current TB, and the regular/bypass mode switch 708 allows code bits to be decoded as regular bins as long as the regular bins counter is not larger or equal to a constraint 724, which specifies a TB regular bin budget or a maximum allowed number of regular bins for the TB being coded. The constraint 724 may be determined based on properties of the TB, e.g., in some embodiments, the constraint is proportional to the current TB size measured by the total number of transform coefficients in the current TB. In some embodiments, the current TB size may be the size of the TB including or excluding the high-frequency subblock regions with forced zero values. For example, in some embodiments, the constraint 724 is determined based on the parameter maxRegBinsCoeff, which specifies the maximum allowed number of regular bins per sample, thus the constraint 724 is computed based on maxRegBinsCoeff*nTBSamples.

Figure 8:
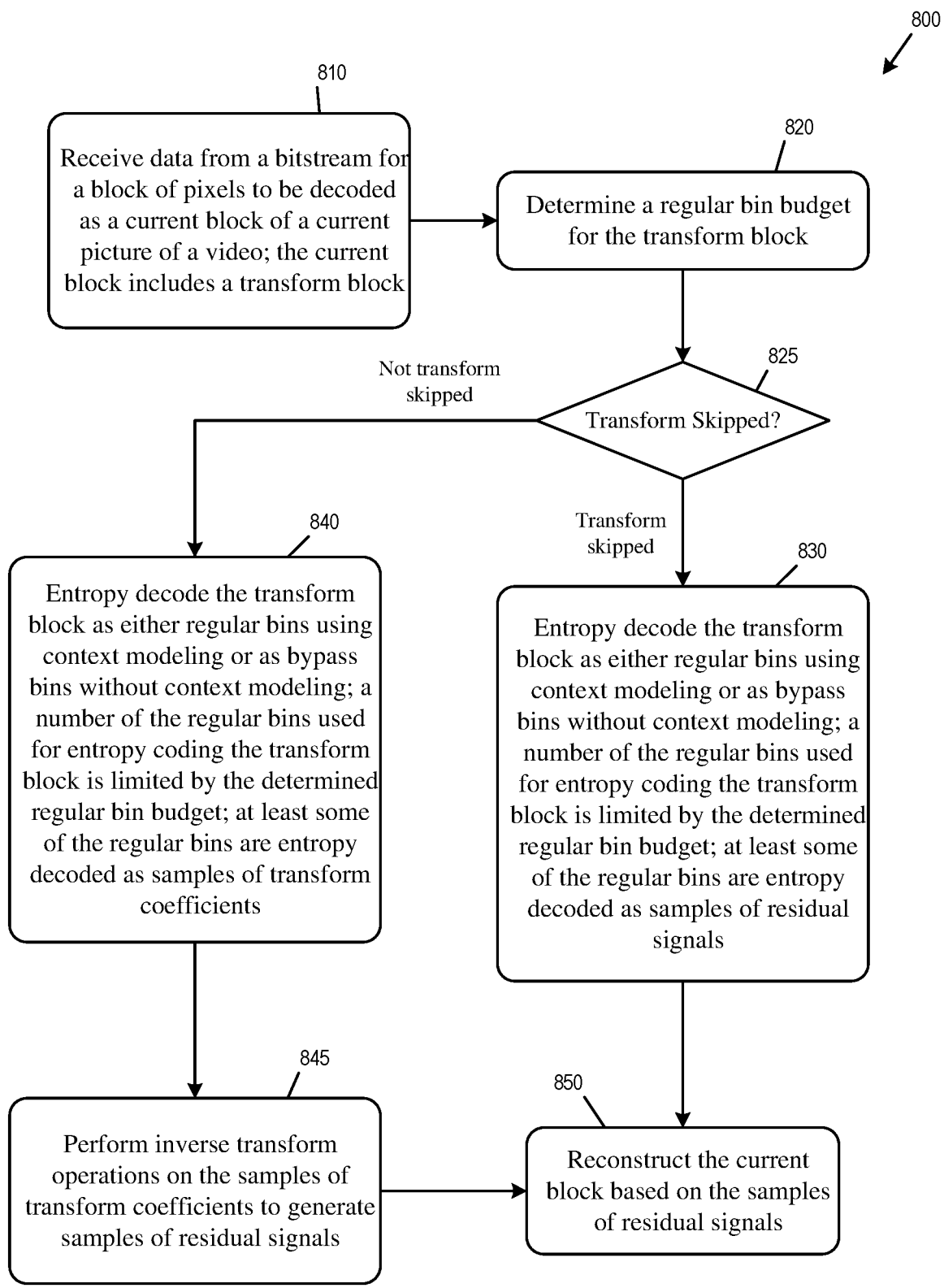
FIG. 8 conceptually illustrates a process for entropy decoding a transform block while imposing a constraint on number of regular bins used, regardless of whether the transform block is transform-skipped.

FIG. 8 conceptually illustrates a process 800 for entropy decoding a transform block while imposing a constraint on number of regular bins used, regardless of whether the transform block is transform-skipped. In some embodiments, one or more processing units (e.g., a processor) of a computing device implementing the decoder 600 performs the process 600 by executing instructions stored in a computer readable medium. In some embodiments, an electronic apparatus implementing the decoder 600 performs the process 800.

The decoder receives (at block 810) data from a bitstream for a block of pixels to be decoded as a current block of a current picture of a video, the current block includes a transform block. In some embodiments, the transform block encompasses one or more subblocks of the current block.

The decoder determines (at block 820) a regular bin budget for the transform block. In some embodiments, the regular bin budget is computed based on (i) a maximum allowed number of regular bins per sample and (ii) a number of samples in the current transform block. In some embodiments, no constraint is applied on a total number of the context-coded bins for an individual subblock. In some embodiments, no constraint is applied on a total number of context-coded bins for an individual syntax element or a coding pass.

The decoder determines (at block 825) whether the transform block is a transform skipped block. In some embodiments, the bitstream comprises an indication signaling whether the transform block is a transform-skip block in which samples of residual signals are not transformed. If the transform block is a transform skipped block, the process proceeds to 830. Otherwise the process proceeds to 840.

The decoder entropy decodes (at block 830) the transform block as either regular bins using context modeling or as bypass bins without context modeling. The number of the regular bins used for entropy coding the transform block is limited by the determined regular bin budget. At least some of the regular bins are entropy decoded as samples of residual signals. The process then proceeds to block 850.

The decoder entropy decodes (at block 840) the transform block as either regular bins using context modeling or as bypass bins without context modeling. The number of the regular bins used for entropy coding the transform block is limited by the determined regular bin budget. At least some of the regular bins are entropy decoded as samples of transform coefficients. In other words, the determined regular bin budget is applicable regardless of whether the regular bins represent samples of (i) residual signals used to reconstruct pixel data of the current block or (ii) transform coefficients generated by transform operations of the residual signals.

In some embodiments, the number of the regular bins used for entropy coding the transform block also includes a number of regular bins used for entropy coding syntax elements for signaling a position of the last significant coefficient of the transform block. In some embodiments, the number of the regular bins used for entropy coding the transform block includes a number of regular bins used for entropy coding syntax elements for signaling one or more coded subblock flags. In some embodiments, the number of the regular bins used for entropy coding the transform block includes a number of regular bins used for entropy coding syntax elements for signaling partial absolute values of transform coefficient levels in the transform block.

The decoder performs (at block 845) inverse transform operations on the samples of transform coefficients to generate samples of residual signals. The process then proceeds to block 850.

The decoder reconstructs (at 850) the current block based on the samples of residual signals, e.g., by adding the samples of residual signals with samples of prediction signals from inter or intra prediction. In other words, the decoder reconstructs the current block based on the entropy decoded transform block.

VII. Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 9:
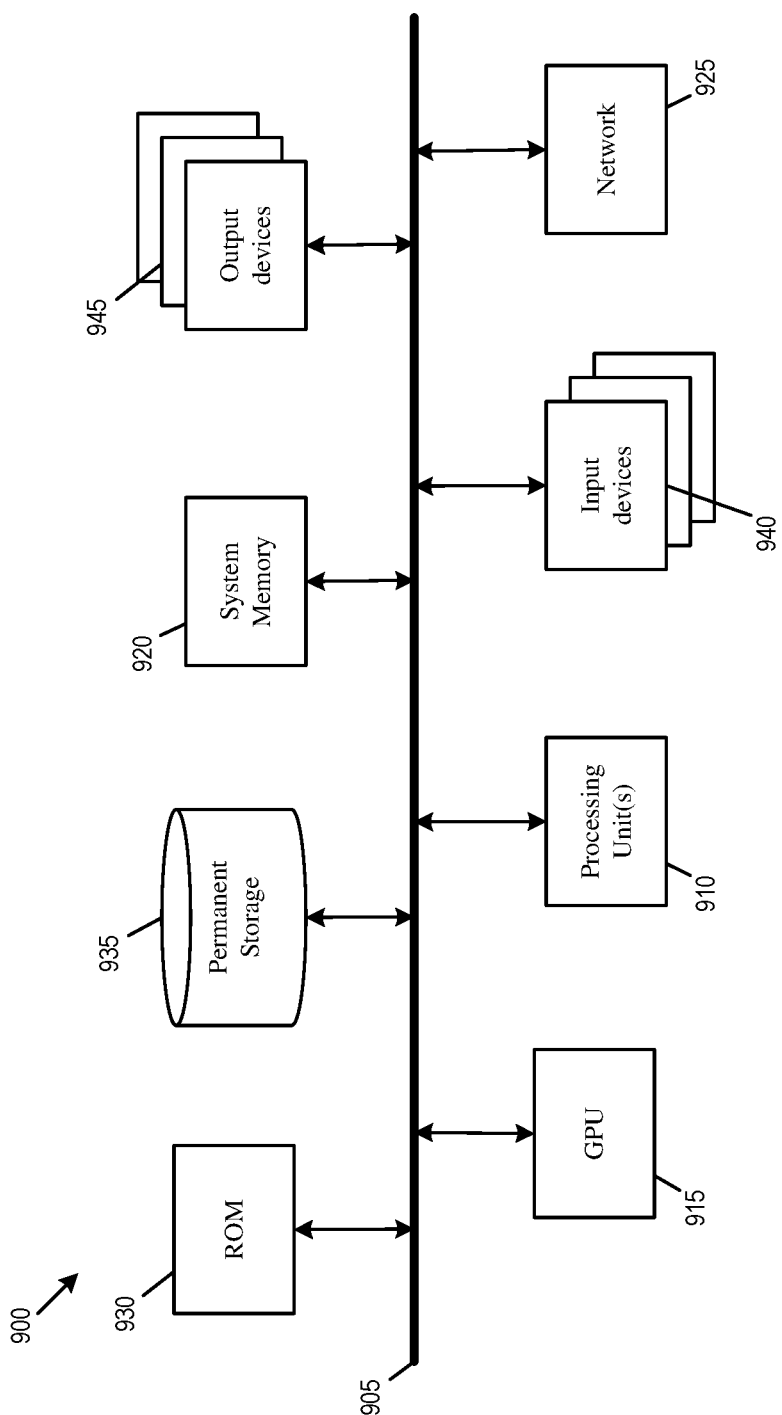
FIG. 9 conceptually illustrates an electronic system with which some embodiments of the present disclosure are implemented.

FIG. 9 conceptually illustrates an electronic system 900 with which some embodiments of the present disclosure are implemented. The electronic system 900 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 900 includes a bus 905, processing unit(s) 910, a graphics-processing unit (GPU) 915, a system memory 920, a network 925, a read-only memory 930, a permanent storage device 935, input devices 940, and output devices 945.

The bus 905 collectively represents all system, peripheral, and chipset buses that communicatively connect the numerous internal devices of the electronic system 900. For instance, the bus 905 communicatively connects the processing unit(s) 910 with the GPU 915, the read-only memory 930, the system memory 920, and the permanent storage device 935.

From these various memory units, the processing unit(s) 910 retrieves instructions to execute and data to process in order to execute the processes of the present disclosure. The processing unit(s) may be a single processor or a multi-core processor in different embodiments. Some instructions are passed to and executed by the GPU 915. The GPU 915 can offload various computations or complement the image processing provided by the processing unit(s) 910.

The read-only-memory (ROM) 930 stores static data and instructions that are used by the processing unit(s) 910 and other modules of the electronic system. The permanent storage device 935, on the other hand, is a read-and-write memory device. This device is a non-volatile memory unit that stores instructions and data even when the electronic system 900 is off. Some embodiments of the present disclosure use a mass-storage device (such as a magnetic or optical disk and its corresponding disk drive) as the permanent storage device 935.

Other embodiments use a removable storage device (such as a floppy disk, flash memory device, etc., and its corresponding disk drive) as the permanent storage device. Like the permanent storage device 935, the system memory 920 is a read-and-write memory device. However, unlike storage device 935, the system memory 920 is a volatile read-and-write memory, such a random access memory. The system memory 920 stores some of the instructions and data that the processor uses at runtime. In some embodiments, processes in accordance with the present disclosure are stored in the system memory 920, the permanent storage device 935, and/or the read-only memory 930. For example, the various memory units include instructions for processing multimedia clips in accordance with some embodiments. From these various memory units, the processing unit(s) 910 retrieves instructions to execute and data to process in order to execute the processes of some embodiments.

The bus 905 also connects to the input and output devices 940 and 945. The input devices 940 enable the user to communicate information and select commands to the electronic system. The input devices 940 include alphanumeric keyboards and pointing devices (also called "cursor control devices"), cameras (e.g., webcams), microphones or similar devices for receiving voice commands, etc. The output devices 945 display images generated by the electronic system or otherwise output data. The output devices 945 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 9, bus 905 also couples electronic system 900 to a network 925 through a network adapter (not shown). In this manner, the computer can be a part of a network of computers (such as a local area network ("LAN"), a wide area network ("WAN"), or an Intranet, or a network of networks, such as the Internet. Any or all components of electronic system 900 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIGS. 5 and 8) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A video decoding method comprising:
   receiving data from a bitstream for a block of pixels to be decoded as a current block of a current picture of a video, the current block comprising a transform block;
   determining a regular bin budget for the transform block;
   entropy decoding the transform block as either regular bins using context modeling or as bypass bins without context modeling,
      wherein a number of the regular bins used for entropy coding the transform block is limited by the determined regular bin budget,
      when the transform block is a transform-skipped block that includes residual samples used to reconstruct pixel data of the current block, and
      when the transform block is a transformed block that includes transform coefficients used to generate the residual samples by applying one or more inverse transform operations on the transform coefficients; and
   reconstructing the current block based on the entropy decoded transform block.

2. The method of claim 1, wherein the regular bin budget is computed based on (i) a maximum allowed number of regular bins per sample and (ii) a number of samples in the transform block.

3. The method of claim 1, wherein the bitstream comprises an indicator indicating whether the transform block is the transform-skipped block.

4. The method of claim 1, wherein the transform block encompasses a plurality of subblocks of the current block.

5. The method of claim 4, wherein the entropy decoding the transform block is performed with no constraint applied on a total number of context-coded bins for any individual subblock of the plurality of subblocks.

6. The method of claim 1, wherein the entropy decoding the transform block is performed with no constraint applied on a total number of context-coded bins for any individual syntax element or any coding pass for the transform block.

7. The method of claim 1, wherein the number of the regular bins used for entropy coding the transform block includes a number of regular bins used for entropy coding syntax elements for signaling a position of last significant coefficient of the transform block.

8. The method of claim 1, wherein the number of the regular bins used for entropy coding the transform block includes a number of regular bins used for entropy coding syntax elements for signaling one or more coded subblock flags.

9. The method of claim 1, wherein the number of the regular bins used for entropy coding the transform block includes a number of regular bins used for entropy coding syntax elements for signaling partial absolute values of transform coefficient levels in the transform block.

10. A video encoding method comprising:
    receiving raw pixel data for a block of pixels to be encoded as a current block of a current picture of a video into a bitstream, the current block comprising a transform block;
    determining a regular bin budget for the transform block;

determining the transform block as either (i) a transform-skipped block that includes residual samples computed from the raw pixel data or (ii) a transformed block that includes transform coefficients generated by applying one or more transform operations on the residual signals samples; and entropy encoding the transform block as either regular bins using context modeling or as bypass bins without context modeling, wherein a number of the regular bins used for entropy coding the transform block is limited by the determined regular bin budget, when the transform block is the transform-skipped block, and when the transform block is the transformed block.

11. An electronic apparatus comprising:

a video decoder circuit configured to perform operations comprising:

receiving data from a bitstream for a block of pixels to be decoded as a current block of a current picture of a video, the current block comprising a transform block;

determining a regular bin budget for the transform block;

entropy decoding the transform block as either regular bins using context modeling or as bypass bins without context modeling, wherein a number of the regular bins used for entropy coding the transform block is limited by the determined regular bin budget, when the transform block is a transform-skipped block that includes residual samples used to reconstruct pixel data of the current block, and when the transform block is a transformed block that includes transform coefficients used to generate the residual samples by applying one or more inverse transform operations on the transform coefficients;

reconstructing the current block based on the entropy decoded transform block.

12. The method of claim 10, wherein the transform block encompasses a plurality of subblocks of the current block, and the entropy encoding the transform block is performed with no constraint applied on a total number of context-coded bins for any individual subblock of the plurality of subblocks.

13. The electronic apparatus of claim 11, wherein the transform block encompasses a plurality of subblocks of the current block, and the entropy decoding the transform block is performed with no constraint applied on a total number of context-coded bins for any individual subblock of the plurality of subblocks.

* * * * *